(12) United States Patent
Huston et al.

(10) Patent No.: US 9,229,116 B2
(45) Date of Patent: Jan. 5, 2016

(54) NEUTRON DETECTOR

(75) Inventors: Alan L Huston, Aldie, VA (US); Brian L Justus, Springfield, VA (US); Alan L Justus, Los Alamos, NM (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 223 days.

(21) Appl. No.: 12/787,668

(22) Filed: May 26, 2010

(65) Prior Publication Data

US 2012/0161013 A1 Jun. 28, 2012

Related U.S. Application Data

(60) Provisional application No. 61/180,955, filed on May 26, 2009, provisional application No. 61/291,159, filed on Dec. 30, 2009.

(51) Int. Cl.
*G01T 1/20* (2006.01)
*G01T 1/203* (2006.01)

(52) U.S. Cl.
CPC ........... *G01T 1/20* (2013.01); *G01T 1/2033* (2013.01)

(58) Field of Classification Search
USPC ............................................. 250/362
See application file for complete search history.

(56) References Cited

U.S. PATENT DOCUMENTS

| | | | | |
|---|---|---|---|---|
| 3,988,586 | A * | 10/1976 | Stuart et al. | 250/390.11 |
| 4,217,496 | A * | 8/1980 | Daniels et al. | 250/369 |
| 6,140,651 | A | 10/2000 | Justus et al. | |
| 7,105,832 | B2 * | 9/2006 | Dai et al. | 250/390.11 |
| 7,282,718 | B2 * | 10/2007 | Shimizu et al. | 250/370.11 |
| 7,439,519 | B2 * | 10/2008 | Feller et al. | 250/390.01 |
| 7,652,261 | B1 * | 1/2010 | Wilson et al. | 250/370.11 |
| 2005/0072904 | A1 | 4/2005 | Aykac et al. | |
| 2008/0001087 | A1 | 1/2008 | Srivastava et al. | |
| 2008/0121806 | A1 | 5/2008 | Grazioso | |
| 2010/0327171 | A1 * | 12/2010 | Robinson et al. | 250/370.05 |

FOREIGN PATENT DOCUMENTS

JP 403208249 * 9/1991 ............. H01J 43/28

OTHER PUBLICATIONS

Datasheet, Brillance 380 Scintillator, Saint-Gobain Ceramics and Plastics, Inc. Published on the Internet at www.crystals.saint-gobain.com (2004).*
Office action in U.S. Appl. No. 12/787,700 (Jun. 22, 2010) and response.
Beacom et al., "GADZOOKS! Antineutrino Spectroscopy with Large Water Cerenkov Detectors" Phys. Rev. Lett. 93, 171101 (2004).
Blasey "Neutron Detection Utilizing Gadolinium Doped Hafnium Oxide Films" (2008).
Kling et al., "Scintillation properties of cerium-doped gadolinium—scandium—aluminum garnets" Nuclear Instruments and Methods in Physics Research A 346 205-212(1994).
Niimura et al., "An imaging plate neutron detector" Nuclear Instruments and MEthod in Physics Research A 349, 521-525 (1994).
Schulte et al., "Development of a Thermal Neutron Detector System Using Large Area Silicon Detectors" Nuclear Science Symposium and Medical Imaging Conference, 1994., 1994 IEEE Conference Record 1, 414-417 (1994).
U.S. Appl. No. 12/787,700, filed May 26, 2010.
Office Action in U.S. Appl. No. 12/787,700 (Oct. 15, 2013).

* cited by examiner

*Primary Examiner* — David Porta
*Assistant Examiner* — Edwin Gunberg
(74) *Attorney, Agent, or Firm* — US Naval Research Laboratory; Joseph T. Grunkemeyer

(57) ABSTRACT

A device having: a scintillator material, an optically transparent element containing a glass or polymer and gadolinium oxide, and one or more photomultiplier tubes adjacent to the scintillator material. The optically transparent element is surrounded by the scintillator material.

8 Claims, 3 Drawing Sheets

NEUTRON DETECTOR

This application claims the benefit of U.S. Provisional Application No. 61/180,955, filed on May 26, 2009 and U.S. Provisional Application No. 61/291,159, filed on Dec. 30, 2009. The provisional applications and all other publications and patent documents referred to throughout this nonprovisional application are incorporated herein by reference.

TECHNICAL FIELD

The present disclosure is generally related to neutron detection.

DESCRIPTION OF RELATED ART

Current programs to interdict nuclear weapons and/or special nuclear materials at international border crossings rely on radiation portal monitors to detect the presence of such materials in various types of vehicles and transport containers. Most of these radiation portal monitors use plastic scintillator materials to detect gamma-rays. Plastic scintillators are attractive because they provide good sensitivity and they are relatively low cost. However, the incidence of false alarms due to naturally occurring sources of radiation and radiopharmaceuticals can be quite high. The inconvenience and costs associated with responding to these false alarms can represent an unacceptably high burden on the interdiction programs.

Gamma-rays interact with plastic scintillators primarily by Compton scattering and the energy distribution produced by a gamma ray is a continuum of energies. The immediate consequence is that plastic scintillators cannot be used to perform spectroscopic measurements that could be used to distinguish naturally occurring sources of radiation from illicit sources of radiation. Other gamma-ray detection materials, such as doped sodium iodide and germanium, are needed to perform spectroscopic measurements. Detection systems using these materials are very expensive and require highly skilled operators. Since plastic scintillators cannot be effectively used for gamma-ray spectroscopy, their utility for detecting gamma-rays is typically limited to the gross counting of gamma pulses. Methods have been recently proposed that utilize the limited energy information contained in the Compton continuum generated in plastic scintillators to provide some level of discrimination (Ely et al., "Discrimination of Naturally Occurring Radioactive Material in Plastic Scintillator Material," *IEEE Trans Nucl. Sci.*, 51(4), 1672-1676 (2004); Ely et al., "The Use of Energy Windowing to Discriminate SNM form NORM in Radiation Portal Monitors," *Nucl. Instr. & Meth. Phys. Res. A*, 560, 373-387 (2006)). These energy-windowing methods attempt to combine the limited spectroscopic information that is present with the pulse counting information to improve the differentiation of the background radiation sources and the targeted radiation sources. However, the common difficulty shared by both approaches is the inability to adequately account for the dynamic character of the background signal. The background radiation levels and spectral shape can be significantly different for each vehicle that passes through a portal monitor.

Current thermal neutron detection technologies, including helium-3 and $BF_3$ proportional counters, and lithium-6 isotopically enriched doped glasses, are very expensive. Detection applications, such as portal monitoring, that require large area sensors are prohibitively expensive.

BRIEF SUMMARY

Disclosed herein is a device comprising: a scintillator material, an optically transparent element comprising a glass or polymer and gadolinium oxide, and one or more photomultiplier tubes adjacent to the scintillator material. The optically transparent element is surrounded by the scintillator material.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
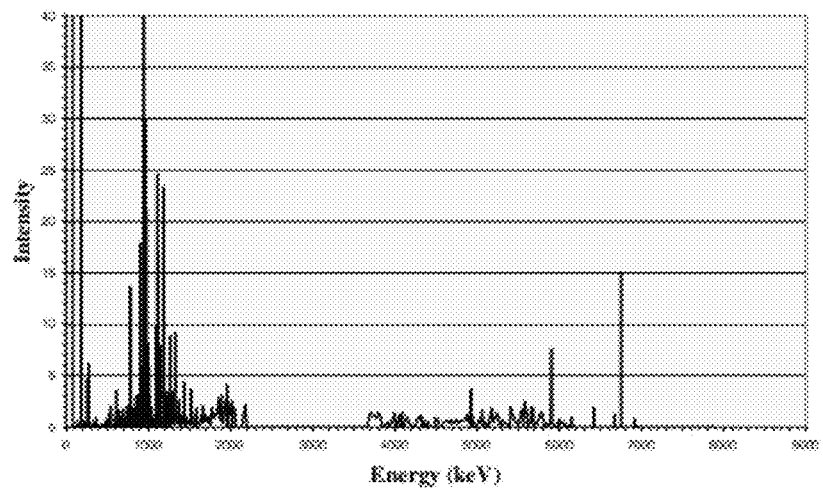
FIG. 1 shows prompt gamma-rays from Gd-157 neutron capture.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Materials and a method for the detection of neutrons are disclosed. The materials and methods provide sensitivity to thermal neutrons, fast neutrons, and low energy γ-rays. The ability to discriminate between signals from natural radiation sources such as terrestrial gamma ray events is provided. The methods may provide, at low cost, large area detectors that combine neutron detection and γ-ray detection in a single material.

The disclosed device may provide an improved technique for the detection of special nuclear materials and provide for effective discrimination between illicit materials and naturally occurring radioactive materials. Instead of relying only on the detection of gamma-rays, the device uses materials and techniques for the detection of neutrons and gamma-rays in a single detector volume. Pulse height discrimination is used to differentiate between signals due to illicit materials and those due to background radiation and other naturally occurring radiation sources. The approach may provide good sensitivity and low cost, similar to plastic scintillators, but significantly reduce the incidence of false alarms, which is an improvement over plastic scintillator portal monitors.

A component of the system may be a high-Z scintillator material that is cost effective to produce in large quantities. The high-Z scintillator may be inherently sensitive to γ-rays and incorporates polymers which work as an effective neutron moderator. The incorporation of a natural gadolinium layer (used for thermal neutron capture) sandwiched between two large-area panels of the scintillator adds an effective neutron detection capability. Unlike previous neutron detectors utilizing gadolinium, the high-energy prompt-capture γ-rays are used to effectively differentiate the neutron signal from other γ-ray events. The new scintillator may provide γ-ray spectral resolution that is better than polyvinyl toluene (PVT) based plastic scintillators.

The system may include signal processing electronics to allow for the simultaneous measurement of the pulse-height, pulse shape, and position of events within the scintillating panel. The measurement of these parameters will allow for real-time deconvolution of the signal, further improving the discrimination of neutron from γ-ray events and the effective signal-to-noise ratio.

Components of the device include, but are not limited to: 1) an optically transparent glass or polymer that contains between 10% and 70% by weight gadolinium oxide; 2) said transparent glass or polymer surrounded by a scintillator material that a) efficiently detects x-rays, γ-rays, electrons, and even neutrons, and b) potentially moderates fast neutrons; and 3) one or more photomultiplier tubes that are used to detect the scintillation light. The Gd-doped glass can have a very large thermal neutron capture cross section ($4.6\times10^4$ barns, where 1 barn=$1\times10^{-24}$ cm$^2$) so that a very thin layer of the material can essentially capture every thermal neutron that impinges upon it. This composite absorption cross section is primarily due to contributions from two isotopes, $^{155}$Gd and $^{157}$Gd with thermal neutron cross sections of 56,200 b and 242,000 b, respectively. For every neutron capture event, a total of about 8 MeV of energy is released in the form of photons and electrons which can be detected by the surrounding scintillator. The energy events near 8 MeV are well separated from the Compton scattering events due to the natural gamma-ray background. As a result, pulse height discrimination can be effectively used to isolate events that are due to neutron capture. Energy windowing can also be used for the low energy γ-ray signals. The incorporation of the Gd-doped glass into the scintillator material provides a new capability to detect both neutrons and γ-rays in the same detector volume.

The neutron capture efficiency can be estimated as a function of the layer thickness according to the formula for neutron absorption in a layer: $I=I_o e^{-\Sigma x}$ where $\Sigma$ is the macroscopic thermal neutron absorption cross-section and x is the thickness of the layer. The macroscopic cross-section is a product of the microscopic cross-section and the number density of the Gd. For a 68% concentration by weight of Gd ions to polymer, corresponding to $5\times10^{21}$ Gd ions per cm$^3$, a thickness of 0.1 cm will stop 99% of the incident neutrons.

In traditional neutron activation analysis, a neutron is captured by an atom, the excited atom then decays back to the ground state with a known half-life (on the order of seconds or longer), emitting gamma-rays in the process. These gamma-rays are then detected and used to determine the amount of material or activity in the sample. Unlike traditional neutron activation analysis techniques that utilize long-lived excited states, the excited state lifetimes of all Gd-156 and Gd-158 excited levels are nanoseconds except for the Gd-156 level at 2137 keV which has a lifetime of 1.3 μs. As a result, the decay to the ground state can be considered to be a prompt reaction. Approximately 8 MeV of energy is released in this prompt decay consisting primarily of photons that range in energy from about 30 KeV up to about 7 MeV. The γ-ray decay spectrum is shown in FIG. 1 for Gd-158.

Gadolinium-based scintillators have traditionally not received much interest because all of the secondary emissions are low LET particles, most are in the same energy range of terrestrial γ-rays, and many of the high energy γ-rays produced escape from a thin scintillator without producing much scintillation light. In the present device neutron events and terrestrial γ-rays may be distinguished in a manner similar to principles first outlined in Nuclear Radiation Detection, second edition by William J. Price, 1958, 1964, McGraw-Hill, Inc.

The very high energy released following Gd neutron capture can be used to effectively differentiate between neutrons and photons. This energy is about 8.53 MeV in the $^{155}$Gd capture event and 7.94 MeV in the $^{157}$Gd event. The low LET electron radiation can be easily captured in even a relatively thin slab of scintillator material. Most of the lower energy photon radiation can be readily absorbed in scintillators of reasonable size. In fact, all of the current detection techniques that utilize gadolinium as the neutron absorber rely on the low energy particles to cause scintillation (Bell et al., Gadolinium-Loaded Plastic and Rubber Scintillators, work supported by the U.S. Department of Energy under contracts DE-AC05-84OR21400 and DE-AC05-96OR22464). The problem is that these scintillators are also sensitive to gamma-rays. These γ-rays cause the same light output and therefore cannot truly be distinguished from neutron events. Therefore, applications for these types of detectors are limited to scenarios where there is a significant thermal neutron population (i.e. an intense neutron beam) compared to the gamma-ray background, like thermal neutron radiography and neutron scattering experiments. Unfortunately, this is counter to the application of detecting weak neutron sources amongst much larger γ-ray backgrounds. So these types of neutron scintillator detectors will simply not work as a Special Nuclear Materials (SNM) detector or search tool and do not have sufficient volume to be an effective gamma-ray detector.

The majority of the energy from the prompt decay is released in the form of one or more γ-rays with a total energy of up to 7 MeV. This energy is well above the energies associated with the natural terrestrial γ-ray background (<3 MeV). So the key is to produce a scintillator material that can effectively absorb this energy while discriminating between neutron events and γ-ray events using pulse height discrimination. Although many of these high-energy γ-rays will not be fully absorbed in the scintillator, the use of a high-Z scintillator will assure that a significant fraction of the full γ-ray energy will be deposited.

In addition, many neutron capture or inelastic scattering events will also contribute to the neutron signal since the neutron capture prompt γ-rays (n,γ) and γ-rays from neutron inelastic scattering (n,n') events are of sufficiently high energy to be detected above terrestrial γ-ray energies. In fact, these types of products from neutron interactions are currently used by the DOE Triage program as confirmatory indicators when neutron sources are present in a sample.

Algorithms can be developed that analyze the detector response and classify the type of event based on a statistical analysis that takes into account variations in background levels. The signal processing and data analysis techniques are fairly straight forward and can be considered mature technologies. Current PVT based systems use energy windowing techniques to grossly define detected γ-ray energies. In its simplest form, the algorithms can define the high energy events as neutron events, while the remaining lower energy portion of the energy spectrum is γ-ray events. Further energy windowing will be based on the ultimate energy resolution of the detector.

Signal processing electronics can digitize the signal from the photomultiplier tubes on an event by event basis. These waveforms can be processed in real-time for the simultaneous calculation of the total energy of event (pulse-height), pulse-shape (time response) and whether it was a single or multisite interaction (position of the event). The simultaneous measurement and of these parameters may allow for real-time deconvolution of the signal to more accurately extract the energy of particle interacting in the scintillator. With these parameters it may be possible to differentiate between high energy γ-rays from internal neutron capture (Gd) and from externally neutron capture (other sources), further improving the understanding of the source of the radiation.

In addition, since the neutron moderation time in the panel is short (~20-30 μsec) and the neutron capture in Gd is prompt, the signal processing electronics and algorithms can allow for coincidence counting. Another novel feature of the scintillation panel and the signal processing electronics is data acquisition in list mode. In list mode, the time of individual reactions within the panel is recorded. This then allows one to identify coincident γ-ray and neutron events.

Fission events (such as the spontaneous fission of SNM) simultaneously release many γ-rays and neutrons. With a large area detection panel, these can be detected and attributed to the same source (i.e. the spontaneous fission event). SNM can then be more reliably detected with very low signal rates and smaller quantities of SNM can be detected.

Figure 2:
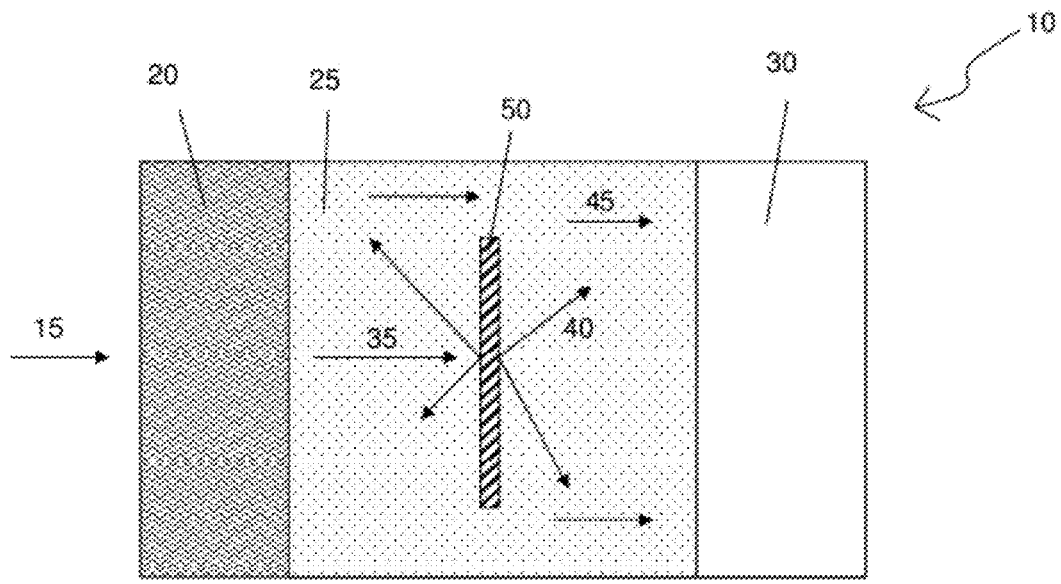
FIG. 2 schematically illustrates the components of the neutron detection approach.

FIG. 2 illustrates the basic operation and the components of the system 10. In order to detect fast neutrons 15, such as those given off as decay products of plutonium, a neutron moderator 20 may be included. When fast neutrons 15 enter the moderator 20 they have a high probability of experiencing collisions that cause them to lose energy. Effective moderators may contain atoms with low atomic weights. A material with a high concentration of hydrogen atoms is suitable. A slab of polyethylene may be used since polyethylene is composed of only carbon and hydrogen atoms, but a scintillator with a high concentration of hydrogen atoms could additionally serve as a moderator material.

Figure 3:
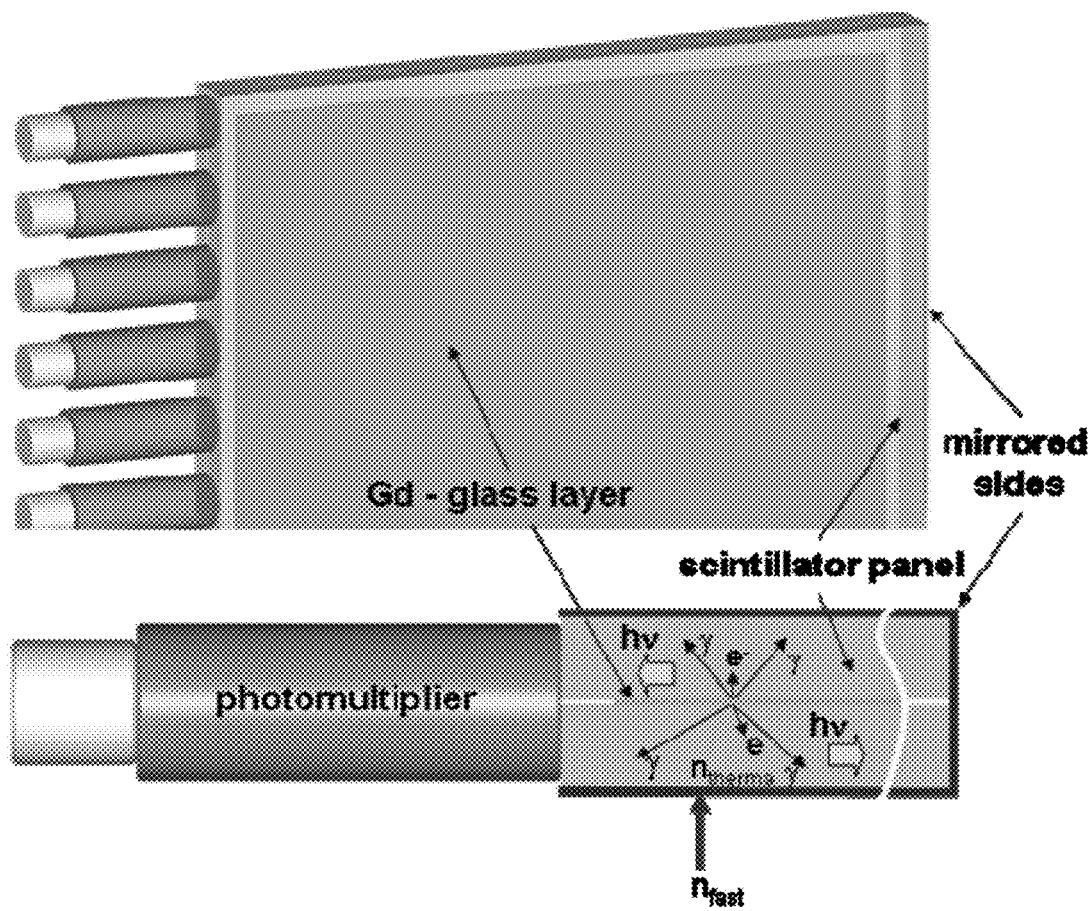
FIG. 3 shows a rendition of large area gamma/neutron detection panel: a) 3-D view, b) top view showing a neutron interaction.

Fast neutrons 15 from a source, such as plutonium, impinge on the detector assembly 10 and are thermalized by interaction with the moderator materials 20. The thermalized neutrons 35 diffuse through the scintillator material 25 and are captured with high efficiency by a thin layer of glass or polymer 50 containing 10%-70% (including 60%) $Gd_2O_3$ in its natural isotopic abundance. Based on the Gd thermal neutron cross section, effectively 100% of the impinging thermal neutrons may be captured by a submillimeter thickness of gadolinium-doped glass having a concentration of 30% gadolinium. The primary thermal neutron capture reaction products for $^{155}Gd$ and $^{157}Gd$ are high energy conversion electrons and γ-rays 40 with a total energy release of about 8 MeV. The γ-ray and secondary electron products are readily detected by the scintillator 25 that surrounds the gadolinium doped glass 50. The energy from the electrons and γ-rays is converted into a very large number of scintillation photons 45 that are detected by the photomultiplier tube (PMT) 30. Both scintillator 25 and Gd glass layers 50 are optically transparent in order to allow passage of scintillation photons 45 to the photomultiplier tube 30. One possible configuration of the device is shown in FIG. 3.

The scintillator may comprise a composite, high-Z scintillator material to detect 100 keV to 10 MeV photons from external sources. High-Z materials contain an atom having an atomic number of at least 45. The characteristics of the composite high-Z scintillator materials may allow spectroscopic features, including high energy peaks, to be resolved, as in expensive inorganic scintillators. Unlike conventional inorganic scintillators, the cost, ruggedness and simplicity of the materials can be more like those of plastic scintillator materials. This is possible because the different phases of the composite material possess the properties that are characteristic of the each respective phase. For example, the high-Z scintillator materials can be composed of distinct organic and inorganic phases. The inorganic, high-Z phase may be capable of stopping high energy photons and electrons. The surrounding organic scintillator phase may receive essentially all of the energy that is deposited in the high-Z phase. This is due to the intimate contact with the inorganic phase and the short distances (sub-micron scale) involved. The composite high-Z scintillators may thus provide spectroscopic information not seen with conventional plastic scintillators but at potentially lower cost than that of conventional inorganic scintillator materials such as doped sodium iodide and cooled germanium.

The composite scintillator materials may operate largely by the mechanisms of pair production and photoelectric effect rather than being dominated by Compton scattering as in plastic scintillator materials alone. The composite, high-Z scintillator materials may be capable of providing spectral resolution comparable to that of NaI since the effective density of the composites can be as high as, or even higher, than that of NaI. The composite high-Z scintillator materials may also perform better than conventional high-Z scintillators that contain high concentrations of heavy metals in solution with organic dyes. The heavy metals cause quenching of the luminescence from the organic dyes, lowering the overall efficiency of detection. Since the scintillator (organic) phase is distinct from the high-Z (inorganic) phase (although it is in intimate contact on a sub-micron scale), quenching of the scintillation due to the high Z atoms does not occur.

Figure 4:
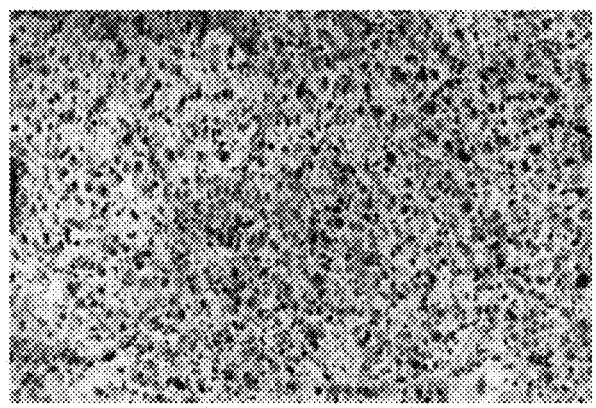
FIG. 4 shows a porous glass structure with greater than 50% pore volume.

In one embodiment of the scintillator, a heavy-metal sol-gel glass framework is intercalated with an organic scintillator. Porous inorganic glasses using heavy metal ions such as lead, barium and lanthanum have been prepared using sol-gel methods (Brinker et al., "Sol-Gel Science" Academic Press, Chapt. 14 (1990)). Sol-gel materials begin as liquid solutions of mixtures of metal-organic complexes. Addition of a small amount of acid or base can catalyze a reaction between the metal-organic complexes that results in the formation of an extended network of metal oxide bonds. Over a period of hours, to several days, the reaction proceeds to the point that the liquid solution is transformed into a stiff gel that consists of a very porous metal oxide network with solvent contained within the pores. As the gel ages, solvent is expelled from the pores and the physical size of the gel mass decreases. The ratio of solid-to-pore volume can be controlled by the choice of appropriate environmental conditions to yield the desired final structure. Any remaining solvent can be removed by a process known as super-critical drying, or by solvent exchange. FIG. 4 is a photograph of a dry porous glass structure with more than 50% void volume that we have prepared using the techniques described above. In the dry state, the structure is highly scattering and appears white. When the void volume is filled with a liquid, such as water or an organic solvent, the structure becomes more transmissive to light due to the reduction of the refractive index difference between the two phases, and is a suitable host for dissolved dyes such as 2,5-biphenyloxazole (PPO) and 1,4-bis(5-phenyloxazole-2-yl) (POPOP) as required for scintillator applications.

Sol-gel structures can be fabricated using metal ions with very high Z, such as lead and/or barium, in combination with titanium oxides to form lead titanate or lead barium titanate structures. These structures can be fabricated having a range of void volumes (~50% void volume, for example). The sol-gel solvent can be removed from the metal oxide structure using super-critical drying techniques. The void volume is refilled with a liquid polymer precursor (monomer). An organic dye is dissolved in the monomer prior to infusion into the metal oxide structure. Polymerization can be thermally induced or catalyzed at low temperature and the final product is a solid, metal oxide/polymer material. The density of lead titanate $PbTiO_3$ is 7.5 g/cm³. With a 50% solid fraction in combination with a 50% polymer fill with a density of 1.5 g/cm³, the total density of the detector will be approximately (0.5×7.5)+(0.5×1.5)=4.5 g/cm³. This density is significantly higher than that of NaI at 3.67 g/cm³.

Lead titanate has a refractive index of 2.6 which is very high compared to any solvent or polymer that could be used to host a luminescent dye. This index mismatch would lead to an unacceptable level of scattering losses. The refractive index can be reduced dramatically by incorporating selected rare earth ions into the matrix. Specifically, samarium and dysprosium, at a concentration of 6 mole % in lead titanate, have been shown to reduce the refractive index to approximately 1.6 (Iakovleva et al., *Thin Solid Films* 446, 50-53 (2004)). The same index lowering effect has also been observed for other rare earth ions including cerium, 0.73 b and ytterbium, 37 b. Based on thermal neutron capture cross section considerations, Ce may be a good first choice, although the index lowering may be more substantial with Yb. Polymers used for the dye host can be engineered to have an index very close to 1.6 using a variety of additives so that scattering losses can be virtually eliminated.

Figure 5:
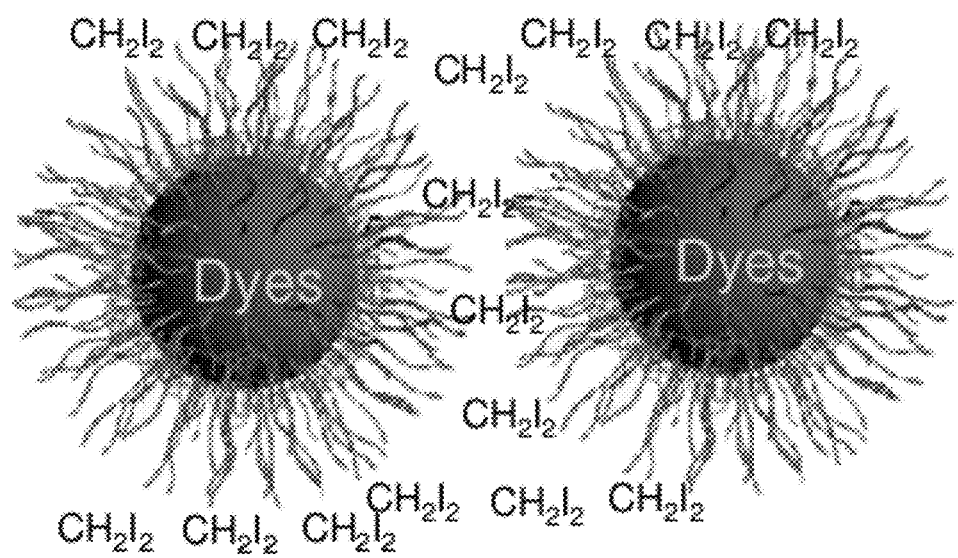
FIG. 5 shows basic micelle structure with non-polar molecular structures on the inside of the bubble.

In another embodiment, diiodomethane is combined with an organic dye. Diiodomethane ($CH_2I_2$) is one of the densest liquids available. In addition, iodine has a number of strong epithermal neutron resonances between 20 eV and 1000 eV that can help to increase the effective neutron capture cross section of a detector. Although $CH_2I_2$ can be used directly as a solvent for many organic dyes, the presence of the iodine dramatically reduces the fluorescence efficiency of the dye due to enhanced intersystem crossing to nonfluorescent triplet states. Therefore, direct dissolution of the dye in $CH_2I_2$ is not useful. In order to effectively utilize the high Z aspect of $CH_2I_2$ in a scintillator a composite solution consisting of encapsulated luminescent dyes that are suspended in $CH_2I_2$ can be used. Dyes can be incorporated into sub-micron micelle structures that effectively isolate them from the surrounding solvent. Micelles are essentially like soap bubbles consisting of a membrane with hydrophobic molecular structures on one side of the membrane and hydrophilic molecular structures on the other side of the membrane. For example, a detergent may be used to form the micelles. Depending on the nature of the solvent, the membrane will form a sub-micron dimension spherical bubble when dispersed in the solvent. In an aqueous solvent, the hydrophilic structures will be located on the outside of the bubble. For a non-aqueous solution, the hydrophilic structures will be inside of the bubble. By mixing a water soluble dye with a micelle-forming liquid and then suspending and dispersing the micelles, the dye molecules can be effectively isolated from the iodine atoms in the solution (FIG. 5). In this way, the dye will exhibit normal fluorescence behavior upon excitation.

A third embodiment uses a composite polymer containing lanthanide ions and luminescent dyes. In this approach, metal ions, such as cerium or lead, can be incorporated into a polymer, such as polyvinyl alcohol (PVA), at concentrations of up to 70% by weight to create an effective high-Z matrix. This material is prepared as a concentrated liquid mixture of metal ions and PVA in water. The solution can be atomized to form micron-sized particles from which the water solvent evaporates and the result is a sub-micron diameter, polymer encapsulated cerium salt. A similar procedure can be used with a luminescent dye co-dissolved with PVA or other polymer to form sub-micron particles of dye-doped polymer. These particles can be mixed together and hot-pressed to form solid, optically transparent structures that can efficiently guide scintillation light to an array of PMTs. The structures may be rods or sheets and may be formed to optimally guide the light to a detector.

The high energy signature associated with the thermal neutron reaction with gadolinium is of considerably higher pulse height than that recorded for terrestrial gamma ray interactions, which are typically <~3 MeV. By setting a discriminator at about 3 MeV, the signals due to terrestrial γ-rays are separated from the neutron interactions. Most neutron capture or inelastic scattering events (i.e., in detector housing and structural assemblies) may also contribute to the neutron detection since the neutron capture prompt gamma rays (n,γ) and gamma rays from neutron inelastic scattering (n,n') events are typically of sufficiently high energy to be detected above the high discrimination level. In addition, any iodine utilized in the detector assembly (for example, within the scintillator) will also yield high pulse height signatures through resonance reactions with epithermal neutrons. Energy windowing techniques can also be used to analyze the signals with energy <3 MeV.

MCNPX (Monte Carlo N-Particle eXtended) calculations may be utilized to optimize the geometry of each of the components of the detector assembly in order to maximize the efficiency of detection of any particular source neutron spectra. This includes optimizing the thickness of the high cross section Gd-glass sheet/film, the thickness of the composite high-Z scintillator material for gamma capture (and neutron moderation if appropriate), the thickness of any polyethylene moderator slab, and the detector area. The background response is minimized by the aforementioned pulse height discrimination; only the relatively few cosmic ray neutron events are registered.

The disclosed device may potentially provide for a number of advantages. It can use a hybrid scintillation material that exploits the properties of two or more components disposed in separate phases within the material. It may provide a large-area neutron sensing capability for passive detection of weapons of mass destruction that employ fissionable plutonium materials. Portal monitors that employ the device may be capable of rapidly scanning boats, vehicles, aircraft, and transport containers for the presence of fissile plutonium materials. For detection of weapons of mass destruction that employ fissionable uranium materials, it may also provide a large-area neutron sensing capability for use in those detection systems utilizing active interrogation techniques.

The high doping concentrations of the Gd-doped glass can provide for essentially 100% thermal neutron capture in a thin layer of the glass. The Gd-doped glass may be manufactured using naturally occurring gadolinium oxide. Isotopically enriched gadolinium is not needed in order to achieve a large thermal neutron cross section. As a result, the gadolinium-doped glass is much less expensive than other neutron sensing materials that must be isotopically enriched.

The high-Z scintillator materials may be low cost and manufacture of large-area detectors will be cost effective.

These materials are sensitive to gamma rays having a wide range of energies, unlike plastic scintillator materials. They contain a significant fraction of organic materials containing hydrogen and carbon atoms, and can therefore effectively moderate fast neutrons.

Previous neutron detectors using gadolinium were unable to differentiate neutron signals from gamma-ray signals. The high-Z scintillator materials disclosed herein provide the ability to discriminate the capture gamma rays and conversion electrons that are produced as a result of the neutron capture reaction from other, unrelated gamma-ray events. The high-Z scintillator materials will be capable of spectrally resolving gamma ray signals. This is not possible using conventional plastic scintillators.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A device comprising:
 a scintillator material;
  wherein the scintillator material is a solution of:
  diiodomethane; and
  a luminescent dye encapsulated in micelles dissolved in the diiodomethane;
 an optically transparent element comprising a glass or polymer and gadolinium oxide;
  wherein the optically transparent element is surrounded by the scintillator material;
 one or more photomultiplier tubes adjacent to the scintillator material; and
 signal processing electronics coupled to the photomultiplier tube that calculate the pulse height of a signal from the photomultiplier tube.

2. The device of claim 1, wherein the optically transparent element comprises about 10 to about 70 wt% gadolinium oxide.

3. The device of claim 1, wherein the glass or polymer comprises polyvinyl alcohol.

4. The device of claim 1, further comprising:
 a neutron moderator adjacent to the scintillator material.

5. The device of claim 4, wherein the neutron moderator comprises polyethylene.

6. A method comprising:
 positioning the device of claim 1 at a neutron detection location;
 monitoring the output of the photomultiplier tubes; and
 recording the detection of a neutron when the output exceeds a predetermined threshold.

7. The device of claim 1, wherein the optically transparent element comprises about 30 to about 70 wt% gadolinium oxide.

8. The device of claim 1, wherein the optically transparent element comprises about 60 to about 70 wt% gadolinium oxide.

* * * * *